May 17, 1927.
V. H. KITRELL
1,629,036
CLUTCH
Filed April 24, 1926
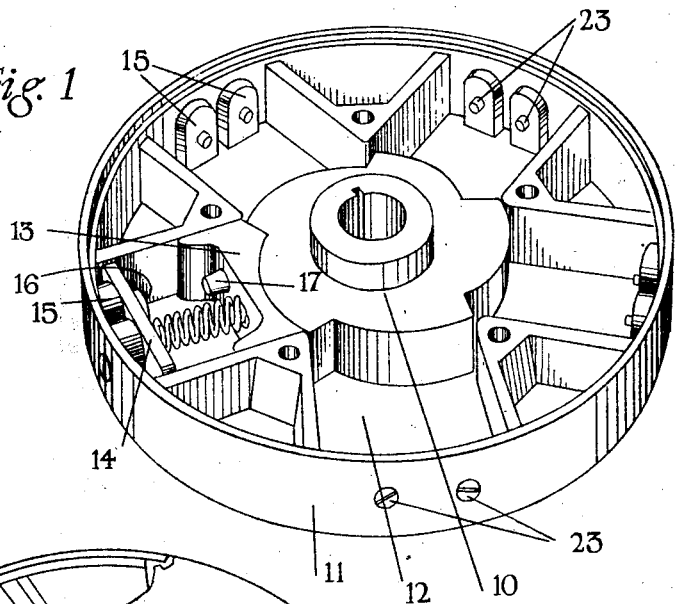
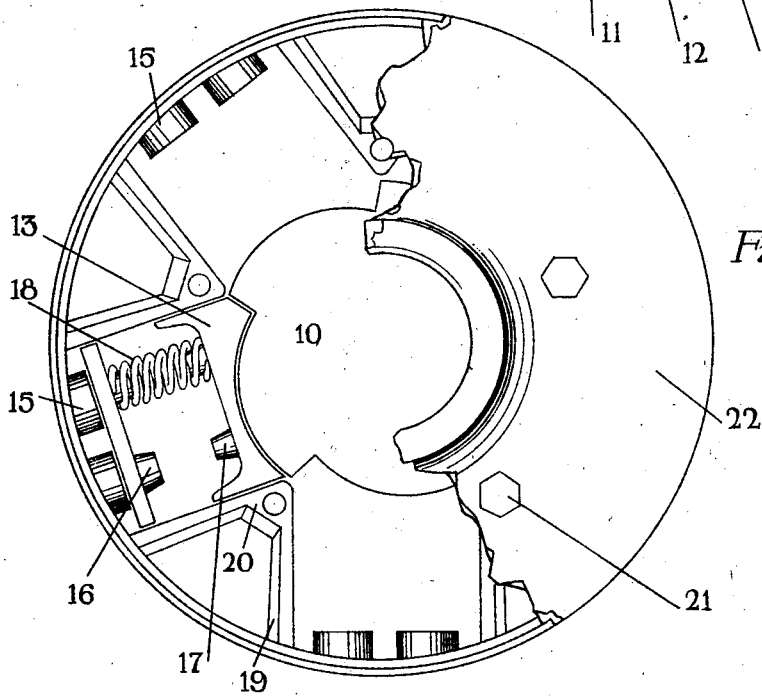
Inventor
V. H. KITRELL
By Emil F. Lange
Attorney Patented May 17, 1927.

1,629,036

UNITED STATES PATENT OFFICE.

VIRGIL H. KITRELL, OF UNIVERSITY PLACE, NEBRASKA.

CLUTCH.

Application filed April 24, 1926. Serial No. 104,442.

My invention relates to clutches and particularly to clutches of the type which is adapted for heavy duty work. It is the object of my invention to provide a clutch which is positive in action and which will warn the attendant of any slippage due to the clogging of the machine. It is also an object of the invention to so adjust the clutch as to adapt it for various loads.

Having in view these objects and others which will be pointed out in the following description, I will now refer to the drawings, in which—

Figure 1 is a view in perspective of the interior portions of the clutch.

Figure 2 is a plan view of the clutch, a portion of the cover being broken away to disclose the interior parts.

The clutch consists primarily of two parts, the ratchet 10 and the drum 11, which are so arranged that when power is applied to the ratchet 10 the power is transmitted to and through the drum 11. The drum 11 is cylindrical in form with one of its sides permanently closed except for the central aperture for receiving the shaft. It is divided into a plurality of radial compartments corresponding in number to the number of teeth on the ratchet 10. These compartments as shown at 12 are each provided with a clutch shoe 13 and an abutment plate 14. Each compartment is also provided with a pair of spacers 15 which are preferably cast integrally with the drum 11, the purpose of these spacers being to provide a flat abutment for the plate 14. The plate 14 and the shoe 13 are provided with bosses 16 and 17 respectively. The bosses 16 and 17 are each equidistantly spaced from the middle or radial line of the part with which they are integral. Springs 18 are employed for the purpose of spacing the plate 14 and the shoe 13 and for holding the shoe 13 in contact with the ratchet 10. Each spring 18 has its ends fitting over a boss 16 and over a boss 17. The shoes 13 are reversible in position as is also the ratchet 10 so that the clutch may be adjusted for either right-handed or left-handed rotation.

The compartments 12 of the drum 11 are formed by means of pairs of walls 19 integral with the drum 11 and having a thickened portion 20 at the apex of each pair. The thickened portions 20 are provided with apertures for receiving bolts 21 or screws or other securing means whereby the cover 22 is secured to the drum 11. In practice I prefer the use of bolts since the threads of screw threaded sockets are too apt to be stripped in such a clutch. Both the edge of the drum 11 and the peripheral edge of the cover 22 are stepped so as to insure a tight joint to prevent leakage of lubricant.

The springs 18 normally force the shoes 13 into engagement with the ratchet 10 but the pressure of these springs may vary between rather wide limits. In order to better control the pressure of the springs I provide set screws 23 passing into the cylindrical wall of the casing and bearing against the abutment plates 14. In order to eliminate the danger caused by projecting ends of set screws, I prefer to provide sockets in the cylindrical wall so that the heads will be either flush with the outer surface of that wall or within the wall. If it is then found that unequal pressures are exerted by opposing springs or that the pressures are too great or too small, it is an easy matter to adjust the tension of the springs in a few minutes' time without the necessity of opening the casing.

In use, the power is applied directly to the shaft of the ratchet 10. This may be done in any one of several different ways. In my original construction I provide a pulley which is integral with the ratchet 10 and which has its bearing directly in the wall of the casing 11. But as explained below, other constructions might be preferable for certain conditions. As viewed in the two figures of my drawing, the rotation of the ratchet is in a clockwise direction. The springs 18 urge the shoes 13 into frictional contact with the ratchet and the parts are normally in the relative position shown in my drawings. The frictional engagement of the shoes with the ratchet causes the casing to rotate with the ratchet. The power is taken from the casing in any desired manner. The casing may serve as a belt pulley or as a gear, or a drive shaft may be secured centrally thereto. Under normal conditions the rotation will proceed without interruption, but in case of an overload the shoe will slip on the ratchet. As the shoe slips up the incline the tension of the springs increases and the frictional engagement of the shoes with the ratchet will also increase until the step is reached. This provides for ample margin of safety, and if the load is still too great when the step is reached, the shoes 13 merely fall onto the next incline. The falling of the shoes results in a series of clicks which are loud enough to be heard by the attendants so that they can stop the machine and investigate and remove the cause of the clogging before any damage occurs.

As before stated, the primary purpose of the invention is to provide a clutch which is especially adapted for heavy duty work. The clutch as herein described has been in operation on a sand dredging machine which gave considerable trouble before the clutch was installed. The sand and gravel alone would go through the dredge very easily, but stones and small boulders in the sand would clog and break the machine. Such accidents not only caused the loss of the machine but they also resulted in the loss due to the idle time of the workmen while the repairs were being obtained and installed. Since the clutch has been employed in this machine, no trouble has occurred. When an obstruction gets into the dredge which the dredge cannot handle, the clutch merely slips and gives the workmen warning so that they may stop the operation of the machine. The obstruction is then removed from the dredge without the loss of an appreciable amount of time and without the slightest injury to the machine.

While I have described the clutch particularly in its relation to a sand dredging machine, it is possible of course, that it may be equally useful with machines like excavators and trench diggers and that some of the novel features of the clutch may be useful with other and lighter machines.

Having thus described my invention in such full, clear, and exact terms that its construction and operation will be readily understood by others skilled in the art to which it pertains, what I claim as new and desire to secure by Letters Patent of the United States is:

1. A clutch comprising a cylindrical casing, a ratchet wheel positioned centrally within said casing and rotatably connected therewith, said ratchet wheel being reversible in position, walls dividing the interior of said casing into radial compartments which are positioned between said ratchet wheel and the interior peripheral surface of said casing, and radially movable clutch shoes within the compartments, said clutch shoes being also reversible whereby said clutch may be reversed by the reversal of said ratchet wheel and said clutch shoes.

2. A driving shaft and a ratchet wheel removably secured thereto, said ratchet wheel being symmetrical and being reversible in direction on said shaft, a cylindrical casing rotatably secured to said shaft and enclosing said ratchet wheel, walls within said casing dividing the interior of said casing into a plurality of radial compartments equal in number to the number of teeth on said ratchet wheel, clutch shoes within said compartments, said clutch shoes each being adapted to span the entire space between contiguous teeth of said ratchet wheel and being reversible within its compartment, a pair of springs within each radial compartment and bearing against the clutch shoe for yieldably forcing the clutch shoe against said ratchet wheel, an adjustable abutment within each radial compartment, said abutments supporting the outer extremities of said springs, and means for adjusting said abutments to adjustably tension said springs, said cylindrical casing being adapted to serve as a belt pulley and said adjusting means being operable from the outer peripheral surface of said casing.

In testimony whereof I affix my signature.

VIRGIL H. KITRELL.